(12) United States Patent
Jeong et al.

(10) Patent No.: US 9,411,415 B2
(45) Date of Patent: Aug. 9, 2016

(54) METHOD AND APPARATUS FOR DISPLAYING DATA

(71) Applicant: Samsung Electronics Co., Ltd., Gyeonggi-do (KR)

(72) Inventors: Jinhong Jeong, Gyeonggi-do (KR); Jihyun Park, Gyeonggi-do (KR); Youngberm Choi, Seoul (KR); Hochul Hwang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 117 days.

(21) Appl. No.: 14/104,183

(22) Filed: Dec. 12, 2013

(65) Prior Publication Data

US 2014/0168070 A1 Jun. 19, 2014

(30) Foreign Application Priority Data

Dec. 17, 2012 (KR) ........................ 10-2012-0147193

(51) Int. Cl.
*G09G 5/00* (2006.01)
*G06F 3/01* (2006.01)
*G02B 27/22* (2006.01)
*G06F 1/16* (2006.01)
*G09G 3/00* (2006.01)
(Continued)

(52) U.S. Cl.
CPC ............ *G06F 3/013* (2013.01); *G02B 27/0093* (2013.01); *G02B 27/2214* (2013.01); *G06F 1/1641* (2013.01); *G06F 1/1649* (2013.01); *G06F 1/1652* (2013.01); *G06F 3/005* (2013.01); *G06F 21/84* (2013.01); *G09G 3/003* (2013.01); *H04N 13/0402* (2013.01); *G06F 3/1423* (2013.01); *G09G 3/20* (2013.01); *G09G 3/3611* (2013.01); *G09G 2300/023* (2013.01); *G09G 2340/0407* (2013.01); *G09G 2340/0464* (2013.01); *G09G 2354/00* (2013.01); *G09G 2356/00* (2013.01); *G09G 2358/00* (2013.01); *G09G 2380/02* (2013.01); *H04N 2013/0463* (2013.01)

(58) Field of Classification Search
CPC ... G06F 17/212; G06F 1/1616; G06F 1/1618; G06F 1/1641; G02B 27/2278
See application file for complete search history.

(56) References Cited

U.S. PATENT DOCUMENTS 6,721,023 B1 4/2004 Weiss et al.
2005/0052341 A1* 3/2005 Henriksson ................. 345/4
(Continued)

FOREIGN PATENT DOCUMENTS

EP 2 309 768 A2 4/2011
EP 2 320 271 A1 5/2011
(Continued)

OTHER PUBLICATIONS

Yamamoto, et al.; "Spatial-coding-based 2-D/3-D/P-P display"; SPIE-IS&T Electronic Imaging; 2009; vol. 7237; SPIE-IS&T.

*Primary Examiner* — Lixi C Simpson
(74) *Attorney, Agent, or Firm* — Cha & Reiter, LLC.

(57) ABSTRACT

According to various embodiments, an apparatus is provided, including: a first display and a second display and a control circuit operatively coupled to the first display and the second display. The control unit is configured to perform operations including determining a relative position between the first display and the second display, and displaying information for presenting to a user via at least one of the first display or the second display, based on the relative position. Other embodiments are possible.

19 Claims, 17 Drawing Sheets

(51) Int. Cl.
*H04N 13/04* (2006.01)
*G02B 27/00* (2006.01)
*G06F 21/84* (2013.01)
*G06F 3/00* (2006.01)
*G06F 3/14* (2006.01)
*G09G 3/20* (2006.01)
*G09G 3/36* (2006.01)

(56) References Cited

U.S. PATENT DOCUMENTS

| | | | |
|---|---|---|---|
| 2005/0219149 A1* | 10/2005 | Tuyls et al. | 345/4 |
| 2007/0165027 A1* | 7/2007 | Nakadaira et al. | 345/426 |
| 2009/0111577 A1* | 4/2009 | Mead | 463/31 |
| 2011/0216064 A1* | 9/2011 | Dahl | G06F 1/1616 345/428 |
| 2011/0249026 A1* | 10/2011 | Singh | 345/630 |
| 2014/0168070 A1* | 6/2014 | Jeong et al. | 345/156 |

FOREIGN PATENT DOCUMENTS

| | | |
|---|---|---|
| EP | 2 333 756 A1 | 6/2011 |
| EP | 2 530 941 A2 | 12/2012 |
| JP | 2010-211211 A | 9/2010 |

\* cited by examiner

FIG. 7
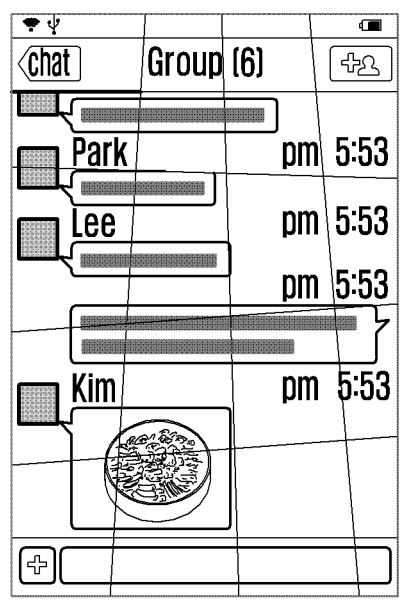
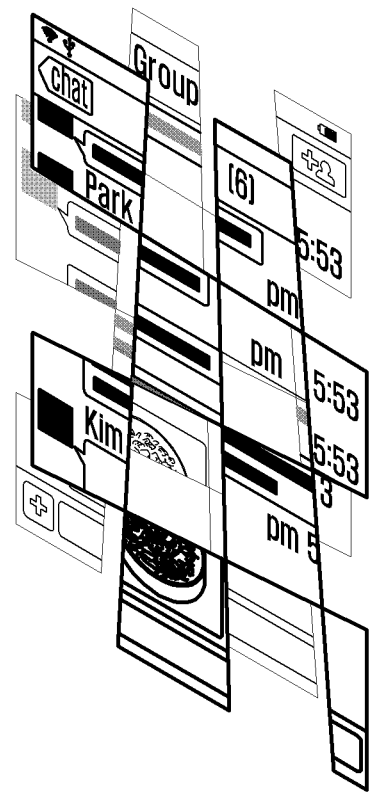
(a)    (b)

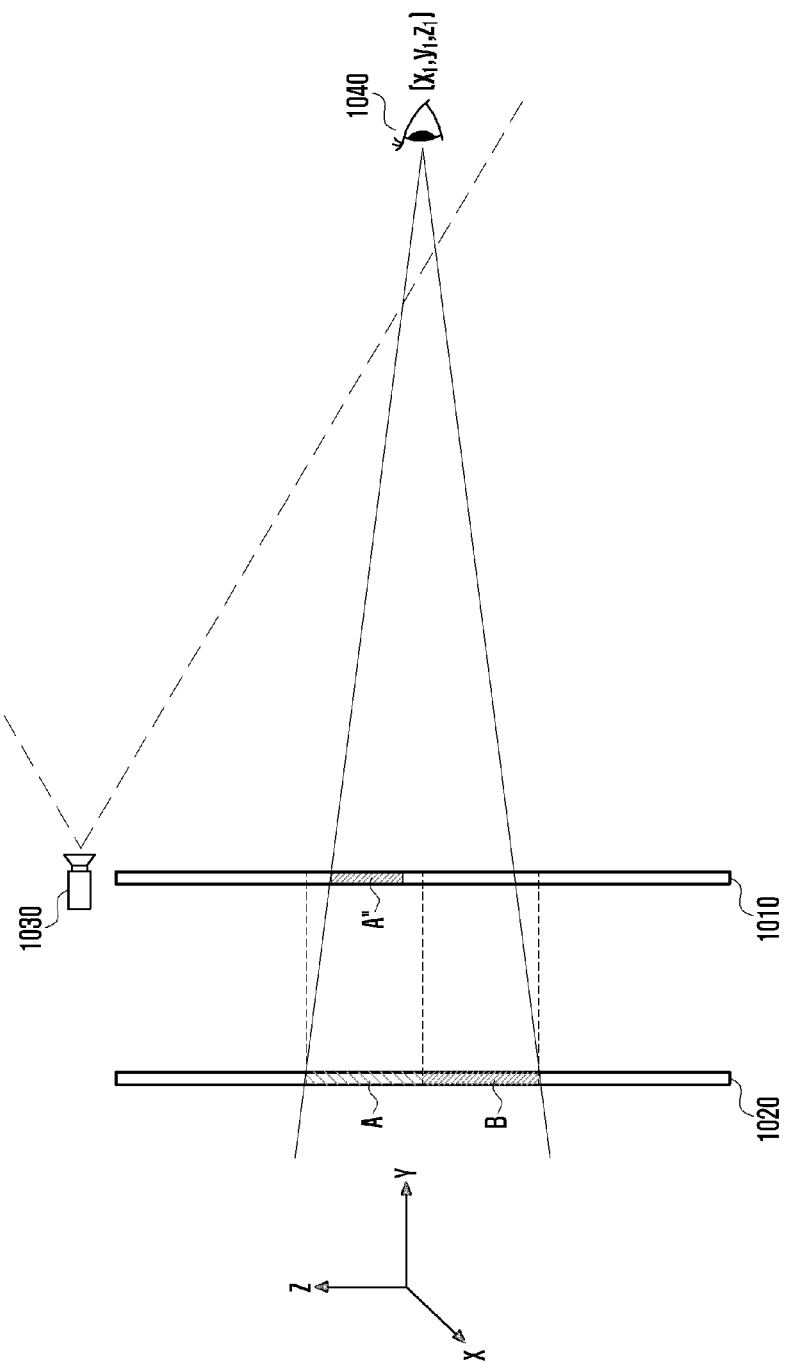

METHOD AND APPARATUS FOR DISPLAYING DATA

CLAIM OF PRIORITY

This application claims the benefit under 35 U.S.C. §119 (a) of a Korean patent application filed on Dec. 17, 2012 in the Korean Intellectual Property Office and assigned Serial No. 10-2012-0147193, the entire disclosure of which is hereby incorporated by reference.

TECHNICAL FIELD

The present disclosure relates to an electronic device and method for displaying data securely.

BACKGROUND

When mobile devices are used in public spaces, private information, such as text messages and photographs may be inadvertently exposed for observation by strangers standing nearby the electronic device's users. A known technique for preventing such exposure is to attach polarizing films to the screens of the electronic devices. Such polarizing films may allow data to be seen well when viewed directly from the front of the electronic devices, while preventing the data from being seen when viewed from the electronic devices' sides. However, the use of polarizing films may deteriorate light transmittance and cause the screens of the electronic devices to appear dim.

SUMMARY

In accordance with one aspect of the disclosure an apparatus comprising: a first display and a second display, and a control circuit operatively coupled to the first display and the second display, configured to perform operations comprising: determining a relative position between the first display and the second display, and displaying information for presenting to a user via at least one of the first display or the second display, based on the relative position.

In accordance with another aspect of the disclosure a method comprising: determining a relative position between a first display and a second display, the first display and the second display being operatively coupled to an electronic device; and displaying information for presenting to a user via at least one of the first display or the second display, based on the relative position.

In accordance with yet another aspect of the disclosure a non-transitory machine-readable storage device storing instructions that, when executed by one or more processors, cause the one or more processors to perform operations comprising: determining a relative position between a first display and a second display; displaying a first portion of the information via the first display in a first size; and displaying a second portion of the information via the second display in a second size, the first size and the second size being determined based at least in part on the relative position.

BRIEF DESCRIPTION OF THE DRAWINGS

FIG. 4, FIG. 5, FIG. 6 and FIG. 7 are diagrams illustrating a division scheme of data in a data display method according to various embodiments of the disclosure.

FIGS. 10A and 10B are diagrams illustrating a method for adjusting a data size according to various embodiments of the disclosure.

DETAILED DESCRIPTION

The following description with reference to the accompanying drawings is provided to assist in a comprehensive understanding of various examples provided in the present disclosure as defined by the claims and their equivalents. It includes various specific details to assist in that understanding but these are to be regarded as mere examples. Accordingly, those of ordinary skill in the art will recognize that various changes and modifications of the examples described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various examples is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a signal" includes reference to one or more of such signals.

Figure 1:
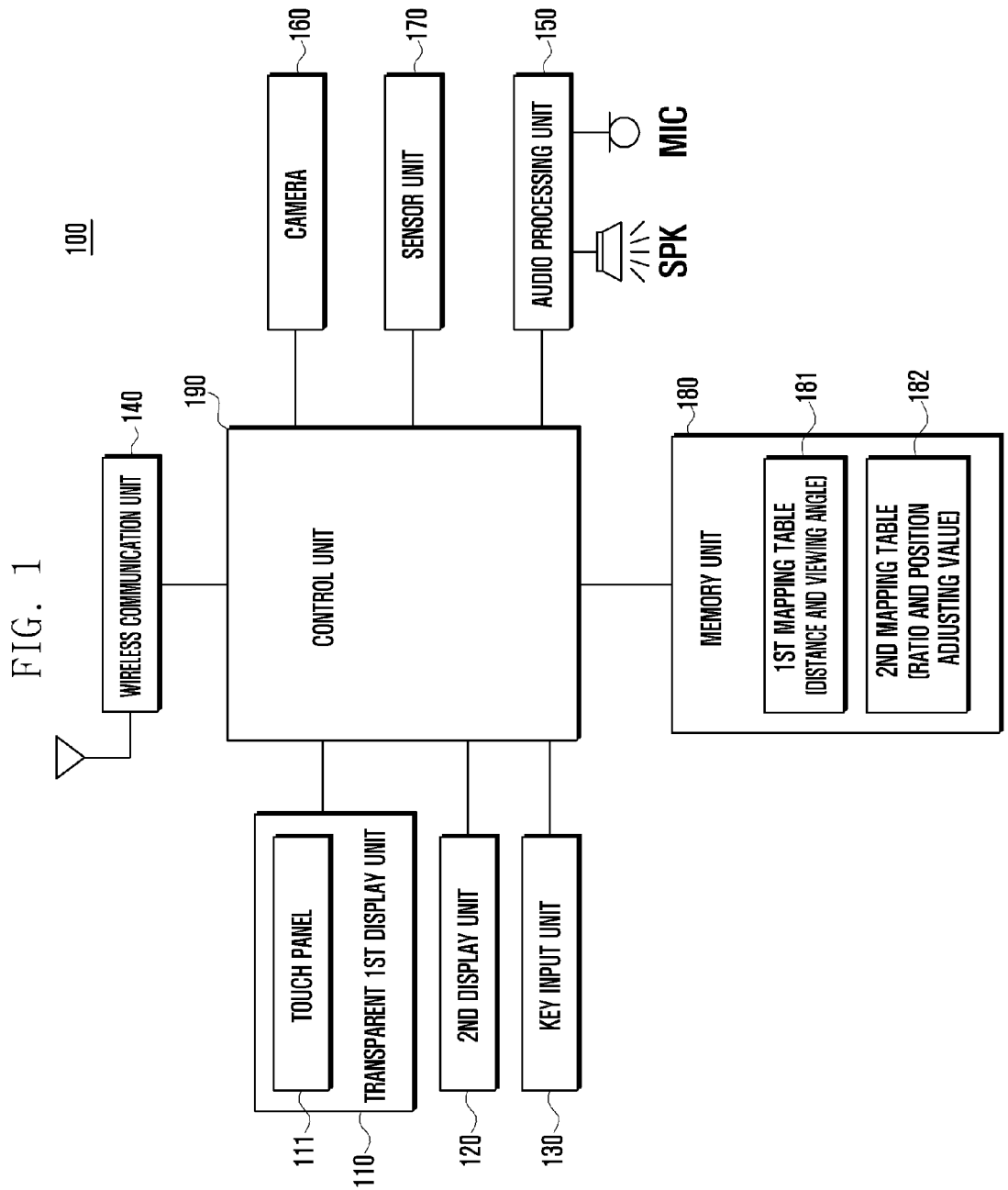
FIG. 1 is a block diagram illustrating an electronic device according to various embodiments of the disclosure.

FIG. 1 is a block diagram illustrating an electronic device in accordance with aspects the present disclosure. As illustrated, the electronic device 100 may include a first display unit 110 having a transparent property, a second display unit 120, a key input unit 130, a wireless communication unit 140, an audio processing unit 150, a speaker SPK, a microphone MIC, a camera 160, a sensor unit 170, a memory unit 180, and a control unit 190.

The first display unit 110 may display data (or information) on the first screen under the control of the control unit 190. Namely, when the control unit 190 performs data rendering and then stores data in a first buffer, the first display unit 110 may convert the data stored in the first buffer into an analog signal and then display it on the first screen. Herein, data may include a text message, a homepage, an image, a document, and the like. Under the control of the control unit 190, the first display unit 110 may display a first data (e.g., a photo) as background and display a second data (e.g., an icon for triggering an application) as foreground. Additionally or alternatively, under the control of the control unit 190, the first display unit 110 may display the first data on a portion of the first screen and display the second data on the other portion of the first screen. The first display unit 110 may be formed of LCD (Liquid Crystal Display) that includes a liquid crystal panel, a polarizing plate, and a backlight unit, all of which are transparent. Therefore, data displayed on the second screen of the second display unit 120 may be projected onto the first screen of the first display unit 110. Meanwhile, the first display unit 110 may be formed of transparent OLED (Organic Light Emitted Diode) or transparent AMOLED (Active Matrix OLED) instead of LCD.

The touch panel 111 may be placed on the first display unit 110. Specifically, the touch panel 111 may be disposed on the first screen of the first display unit 110 (i.e., referred to as add-on type) or inserted in the first display unit 110 (i.e., referred to as on-cell type or in-cell type).

The touch panel 111 may create an analog signal (e.g., a touch event) in response to a user's gesture thereon, perform an analog-to-digital conversion, and transfer a digital signal to the control unit 190. Herein, a touch event may include touch coordinates (x, y). When any touch coordinates are received from the touch panel 111, the control unit 190 may recognize that any touch occurs on the touch panel 111 by means of a touch tool (e.g., finger or pen). If touch coordinates are not received any more from the touch panel 111, the control unit 190 may recognize that a touch is released from the touch panel 111. If touch coordinates are changed, for example, from $(x_1, y_1)$ to $(x_2, y_2)$, the control unit 190 may recognize that a touch is moved on the touch panel 111. In response to the touch move, the control unit 190 may calculate a displacement (dx, dy) of the touch and a move velocity of the touch. Particularly, based on touch coordinates, whether a touch is released or not, whether a touch is moved or not, a location variation of touch, and a move velocity of touch, the control unit 190 may recognize a user's gesture as one of a touch, a multi touch, a tap, a double tap, a long tap, a tap-and-touch, a drag, a flick, a press, a pinch-in, a pinch-out, and the like.

A touch refers to a gesture to make a touch tool be in contact with any point on the touch panel 111, and a multi touch refers to a gesture to make two or more touch tools (e.g. thumb and forefinger) be in simultaneous contact with two or more points. A tap refers to a gesture to touch any point on the touch panel and then release (namely, touch-off) a touch tool from the touch point without moving the touch tool, and a double tap refers to a gesture to tap twice the same point on the touch panel. A long tap refers to a gesture to touch relatively longer than a tap and then release a touch tool from the touch point without moving the touch tool. A tap-and-touch refers to a gesture to tap any point on the touch panel and then touch the same point within a given time (e.g., 0.5 second). A drag refers to a gesture to move a touch tool in an arbitrary direction while maintaining a touch on the touch panel. A flick refers to a gesture to move a touch tool more quickly than a drag and then release the touch tool. A press refers to a gesture to touch and push any point on the touch panel. A pinch-in refers to a gesture to touch simultaneously two points on the touch panel and then to narrow a distance between the touch points. A pinch-out refers to a gesture to touch simultaneously two points on the touch panel and then to widen a distance between the touch points.

The touch panel 111 may have a pressure sensor to detect the pressure of a touch point. Pressure information is transferred to the control unit 190, which may distinguish between a touch and a press on the basis of such pressure information. The touch panel 111 may be a complex touch panel that is composed of a finger touch panel for detecting a finger gesture and a pen touch panel for detecting a pen gesture. The finger touch panel may be formed of a capacitive type, a resistive type, an infrared type, or an ultrasonic type. The finger touch panel may create a touch event by a user's finger gesture or any other equivalent (e.g., an action of a conductive tool capable of causing a change in capacitance). Meanwhile, the pen touch panel may be formed of an electromagnetic induction type. Therefore, the pen touch panel may create a touch event by a stylus pen which is specially produced to form a magnetic field.

The second display unit 120 may be disposed under the first display unit 110. The second display unit 120 may display data on the second screen under the control of the control unit 190. Namely, when the control unit 190 performs data rendering and then stores data in a second buffer, the second display unit 120 may convert the data stored in the second buffer into an analog signal and then display it on the second screen. Particularly, the control unit 190 may divide data into two parts, and then store one part in the first buffer and the other part in the second buffer. Under the control of the control unit 190, the first display unit 110 may display the first part stored in the first buffer on a portion of the first screen. The second display unit 120 may display the second part stored in the second buffer on the second screen under the control of the control unit 190 such that the second part is projected onto the other portion of the first screen. Therefore, data may be normally seen from front view of the first screen and abnormally seen from side view (i.e., slant view) of the first screen.

The key input unit 130 may include one or more keys and/or keypads for entering letters or numbers and setting various functions. The keys may include mechanical switches, optical switches, capacitive switches, soft keys, and/or any other suitable type of switch. These keys may include a menu invoking key, a screen on/off key, a power on/off key, a volume adjusting key, and the like. The key input unit 130 may create a key event in connection with a user's setting action or a function control of the electronic device 100 and then transfer the key event to the control unit 190. Such a key event may include a power on/off event, a volume adjusting event, a screen on/off event, a shutter event, and the like. In response to the received key event, the control unit 190 may control various elements, as listed above, of the electronic device 100. Meanwhile, a key of the key input unit 130 may be referred to as a hard key, whereas a virtual key displayed on the display unit 110 or 120 may be referred to as a soft key.

The wireless communication unit 140 may perform a voice call, a video call, or a data communication with any external entity through a network under the control of the control unit 190. Normally the wireless communication unit 140 may include an RF (radio frequency) transmitter that up-converts the frequency of an outgoing signal and then amplifies the signal, and an RF receiver that amplifies with low-noise an incoming signal and down-converts the frequency of the signal. Also, the wireless communication unit 140 may include a mobile communication module (e.g., a 3-generation mobile communication module, a 3.5-generation mobile communication module, a 4-generation mobile communication module, etc.), a digital broadcast module (e.g., a DMB module), and/or a short-range communication module (e.g., a Wi-Fi module, a Bluetooth module, or an NFC (Near Field Communication) module).

The audio processing unit 150 may perform the input and output of audio signals (e.g., voice data) through the speaker SPK and the microphone MIC in connection with speech recognition, voice recording, digital recording, and a call. Specifically, the audio processing unit 150 may receive audio signals from the control unit 190, convert the received audio signals into analog signals through a digital-to-analog conversion, and then output them to the speaker SPK. Further, the audio processing unit 150 may receive audio signals from the microphone MIC, convert the received audio signals into digital signals through an analog-to-digital conversion, and then transfer them to the control unit 190. The speaker SPK may convert audio signals received from the audio processing unit 150 into sound waves and then output them. The microphone MIC may convert sound waves collected from people or any other sound source into audio signals.

The camera 160 may capture images of any subject under the control of the control unit 190 and then transfer them to the control unit 190. Specifically, the camera 160 may include a lens through which light rays converge, an image sensor which converts light rays into electric signals, and an image signal processor (ISP) which processes electric signals received from the image sensor so as to produce raw data and then outputs them to the control unit 190. The ISP of the camera 160 may have a module which processes raw data to preview images and then outputs them to the control unit 190, and a module which processes raw data to compressed images and then outputs them to the control unit 190. Additionally, the ISP may further have a module which processes the preview images and the compressed images to interleaved data and then outputs them to the control unit 190. The control unit 190 may detect a shutter event (e.g., a user's tap gesture on a shutter button displayed on the first display unit 110) from the touch panel 111 or the key input unit 130 and, in response to the shutter event, stores a compressed image corresponding to a preview image in the memory unit 130. A preview image which is a real-time image being displayed on the display unit 110 may be resized from raw data to meet the size of screen. Namely, a preview image is low-resolution data reduced from raw data of high resolution. A compressed image which is used for storage is data compressed in the format of JPEG or the like. Interleaved data has a mixed form of a preview image and a compressed image. Namely, if images are formed in the unit of packet, interleaved data is a random or regular mixture of preview image packet and compressed image packet. Meanwhile, the camera 160 may further include an infrared filter that separates infrared rays from light rays converging through the lens and then outputs them to the image sensor.

The sensor unit 170 may detect a physical quantity (e.g., quantity of light, velocity, acceleration, altitude, gravity, etc.) or variation thereof, create detection information, and transfer it to the control unit 190. The sensor unit 170 may include an acceleration sensor, a gyroscope, a terrestrial magnetism sensor, and the like. Such sensors may be integrated into a single chip or formed as separate individual chips.

The memory unit 180 may include any suitable type of volatile and/or non-volatile memory, such as a hard disk, a Random Access Memory (RAM), Read-Only Memory (ROM), flash memory, and the like. The memory unit 180 may store a first mapping table 181. The mapping table 181 may include an indication of a distance and/or an indication of a viewing angle. In some implementations, the indication of distance may identify a distance between the electronic device 100 and a user's eye. For example, the control unit 190 may receive an image from the camera 160 that depicts the face of the user of the electronic device 100. The processor 190 may then process the image to detect an eye region in the received image, and calculate the location and size of the eye region and determine the distance between the electronic device 100 and the user's eye based on at least some of that information. Used to detect the eye region may be a technique to extract a left-eye region and a right-eye region from an image by using pre-stored eye-shaped sample image. Also, used to calculate the location of the eye region may be a technique that involves selecting coordinates (x1, y1) in the left-eye region, selecting coordinates (x2, y2) in the right-eye region, finding central coordinates ((x1+x2)/2, (y1+y2)/2), and adopting the central coordinates as the location of the eye region. In case the minimum unit of an image is defined as pixel, x-coordinate denotes the x-th pixel in the X-axis direction, and y-coordinate denotes the y-th pixel in the Y-axis direction. And also, used to calculate the size of the eye region may be a technique to count the number of pixels contained in the left-eye region (e.g., 10*10, etc.), count the number of pixels contained in the right-eye region (e.g., 10*10, etc.), and adopt the sum of pixels as the size of the eye region. The above techniques are, however, exemplary only and not to be considered as a limitation. The present disclosure is not limited to any particular technique for identifying eyes and/or eye regions.

After the location and size of the eye region are calculated, the control unit 190 may retrieve the first mapping table 181 from the memory unit 180 and then use the mapping table 181 to determine the distance between the electronic device 100 and a user's eye based on at least one of the size(s) and location(s) of the eye region(s) in the received image. For example, if 280<x<320, 280<y<320, and 200<SUM<300, a distance corresponding to the location (x, y) and size (SUM) of the eye region may be 30 centimeters. Additionally or alternatively, the control unit 190 may also use the mapping table 181 to extract a viewing angle at which the user views the electronic device based on at least one of the size(s) and location(s) of the eye region(s) in the received image. For example, if 280<x<320, 280<y<320, and 200<SUM<300, a viewing angle corresponding to the location (x, y) and size (SUM) of the eye region may be 50 degrees. Values in the first mapping table 181 may depend on a space between two screens, a resolution, an angle of view in camera, and the like.

The memory unit 180 may further store a second mapping table 182 used to determine a ratio and a location adjusting value. Specifically, in instances where a first part of data (e.g., an image, text, etc.) that is being presented on the terminal 100 is displayed on the screen of the first display unit 110 and a second part of the data is displayed on the screen of the second display unit 120, the second mapping table 182 may identify at least one of a size ratio of the first part to the second part and a location adjusting value of the second part. For example, the location adjusting value may be used by the control unit 190 to adjust a display location of the second part so as to minimize an overlap of (or a gap between) the second part and the first part and help the first part and second part better fit together as a single data item (e.g., an image, text, etc.) when viewed from a particular viewing angle. The control unit 190 may use the second mapping table 182 to determine the ratio of the first part to the second part based on at least one of the user's eye and/or distance between the user and the device 100. For example, if a distance is 30 centimeters, a size ratio may be 0.8 (in case the size of the second part is 1, the size of the first part is 0.8). Additionally or alternatively, the control unit 190 may use the second mapping table 182 to determine the location adjusting value based on the determined viewing angle. For example, if the viewing angle is 50 degrees, the location adjusting value (Δx, Δy) may be (3, 3).

The memory unit 180 may store a booting program, an operating system (OS), and a variety of applications. As well known, the OS not only may act as an interface between hardware and each application and between respective applications, but also may manage computer resources such as a CPU, a GPU, a main memory unit, and a secondary memory unit. Also, the OS may control the operation of hardware and the execution of applications, define the order of tasks, control the arithmetic operation of CPU and GPU, and manage the storage of data and files. Applications may be classified into embedded applications and third party applications. For example, embedded applications may include a web browser, an email program, an instant messenger, and the like. Third party applications may be received from any web market server and installed in the electronic device 100. When electric power is supplied from a battery to the control unit 190 in the electronic device 100, a booting program may be loaded on a main memory unit (e.g., RAM) of the control unit 190. Then the booting program may load the OS on the main memory unit, and the OS may load selected applications on the main memory unit. Meanwhile, the memory unit 180 may further store a speech-to-text (STT) program specially designed for converting speech data to text.

The control unit 190 may include one or more electronic circuitry modules. Additionally or alternatively, the control unit 190 may include any suitable type of processing circuitry, such as an ARM-based processor, an Exynos processor, an X86-based processor, a Field-Programmable Gate Array (FPGA), and or any other suitable type of processor. In operation, the control unit 190 may control signal flows between internal components of the electronic device 100, perform data processing, and control the supply of power from a battery to the respective components, and/or any other suitable aspect of the operation of the electronic device 100. More particularly, as noted above, the control unit 190 may include a central processing unit (CPU) and a graphic processing unit (GPU). As is well-known, the CPU is a key control unit of a computer system that performs calculation and comparison of data and interpretation and execution of commands. The GPU is a graphic control unit that performs, in place of the CPU, calculation and comparison of graphic-related data and interpretation and execution of related commands. Each of the CPU and GPU may be formed of a single package into which two or more independent cores (e.g., quad-core) are integrated. Alternatively, the CPU and GPU may be integrated into a single chip (i.e., system on chip (SoC)). Alternatively, the CPU and GPU may be packaged in the form of multi-layer. A structure having the CPU and GPU may be referred to as an application processor (AP).

In some aspects, the control unit 190 may calculate an incline of the electronic device 100 (in a particular direction, relative to the ground level) by using acceleration information received from the sensor unit 160. Using the calculated incline, the control unit 190 may calculate a more exact distance and viewing angle. For example, the first mapping table 181 may define "a distance and viewing angle" corresponding to "a location, size and incline of an eye region". Meanwhile, the calculated incline may include a roll angle (Φ), a pitch angle (θ), and a yaw angle (ψ). A roll angle (Φ) denotes a rotational angle on the X-axis, a pitch angle (θ) denotes a rotational angle on the Y-axis, and a yaw angle (ψ) denotes a rotational angle on the Z-axis. As well known, a triaxial acceleration sensor may detect acceleration of motion and acceleration of gravity. If there is no motion of the electronic device 100, the control unit 190 may receive information about acceleration of gravity from the sensor unit 160. For example, in case acceleration information received from the sensor unit 160 indicates that X-axis acceleration and Y-axis acceleration are 0 m/sec$^2$ and Z-axis gravity acceleration is +9.8 m/sect, the control unit 190 may determine the incline (Φ, θ, ψ) of the electronic device 100 as (0, 0, 0). In this way, the control unit 190 may calculate the incline of the electronic device 100. Alternatively, based on an attitude calculation algorithm using Eulerian angles, an attitude calculation algorithm using the extended Kalman filter, an acceleration prediction algorithm, or any other incline calculation technique, the control unit 190 may calculate the incline of the electronic device 100.

Figure 2:
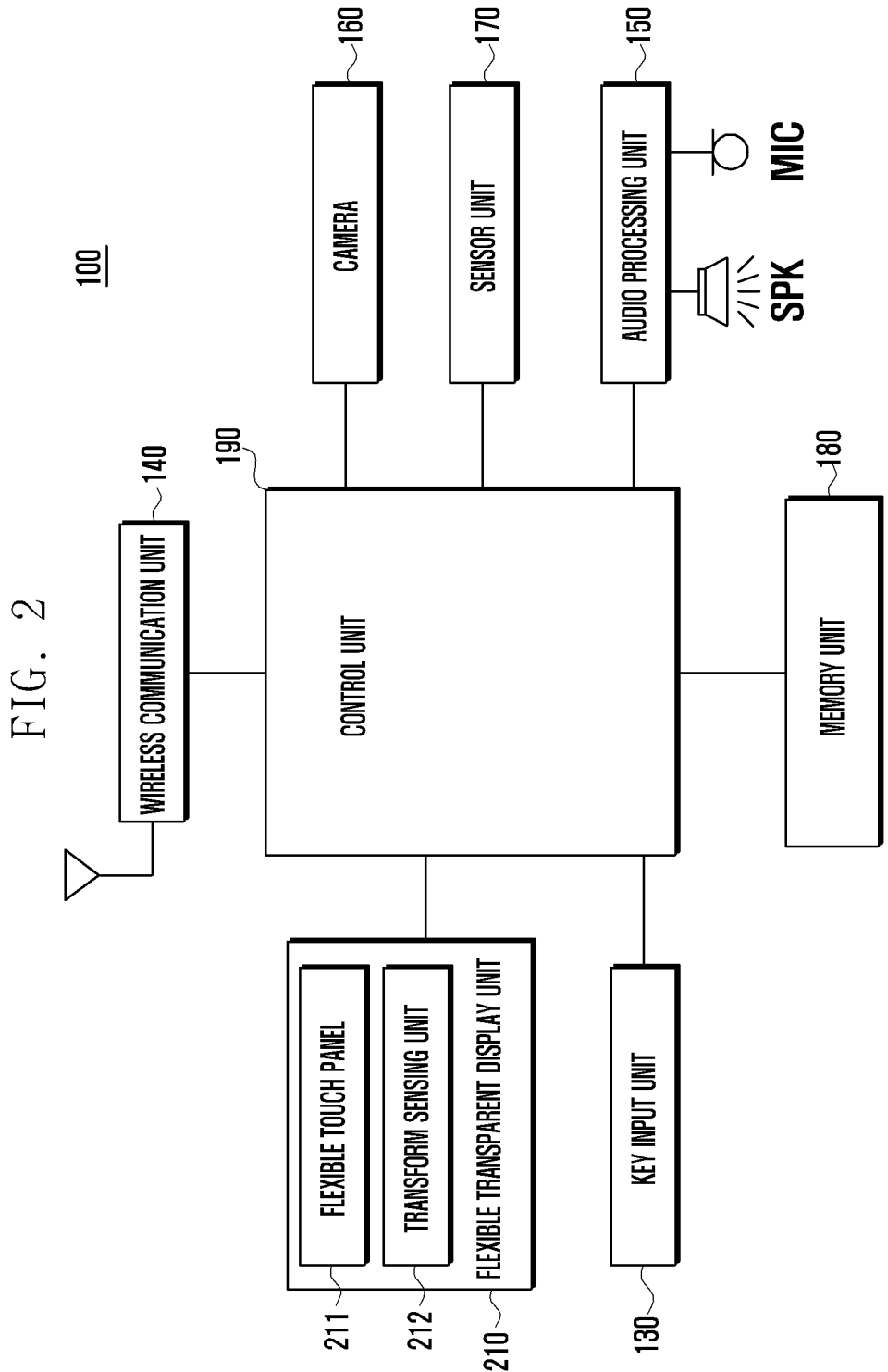
FIG. 2 is a block diagram illustrating an electronic device according to various embodiments of the disclosure.

FIG. 2 is a block diagram of the electronic device 100 in accordance with another aspect of the present disclosure. As illustrated, in this example, the electronic device 100 may include a flexible transparent display unit 210, the key input unit 130, the wireless communication unit 140, the audio processing unit 150, the speaker SPK, the microphone MIC, the camera 160, the sensor unit 170, the memory unit 180, and the control unit 190.

The flexible transparent display unit 210 may be formed of any flexible and transparent material (e.g., film) and it may be configured to display data on the screen under the control of the control unit 190. The flexible transparent display unit 210 may include a flexible touch panel 211 and a transform sensing unit 212. The flexible touch panel 211 may be disposed on the flexible transparent display unit 210 (i.e., referred to as add-on type) or inserted in the flexible transparent display unit 210 (i.e., referred to as on-cell type or in-cell type).

The transform sensing unit 212 may detect information about the transform of the flexible transparent display unit 210 and transfer it to the control unit 190. The transform sensing unit 212 may include sensors for detecting transform information. Such sensors may be installed in the flexible transparent display unit 210 in add-on type, on-cell type or in-cell type and detect transform information at respective positions. Sensors of the transform sensing unit 212 may be disposed in the form of grid, for example, in flexible transparent display unit 210. Therefore, when the flexible transparent display unit 210 is transformed, distances between respective sensors may vary according to such transform. Then each sensor may create transform information (e.g., a voltage variation ΔV) corresponding to a distance variation and transfer it to the control unit 190.

The control unit 190 may receive transform information from the transform sensing unit 212 and calculate a measure of a bend of the flexible transparent display unit 210. The measure of the bend may include any suitable characteristic of a bend of the flexible transparent display unit. By way of example, the measure of the bend may indicate a direction of the bend, angle of the bend (e.g., angle of arch formed by bending the display unit, angle formed between points lying on different portions of the display unit and a line along which the display unit is folded, etc.). When there is no transform of the flexible transparent display unit 210 (namely, when the flexible transparent display unit 210 is not deformed), the control unit 190 may be aware of initial coordinate values of respective sensors. For example, the initial coordinate values of respective sensors may be relative coordinate values resulting from the coordinate value (e.g., (0, 0, 0)) of the central sensor located at the center of the flexible transparent display unit 210. When transform information is received from the transform sensing unit 212, the control unit 190 may convert the transform information (e.g., a voltage variation ΔV) into a location variation (Δx, Δy, Δz) and add the location variation to the initial coordinate values to calculate current coordinate values of the respective sensors. Then the control unit 190 may calculate angles of the respective sensors by using the current coordinate values. The calculated angles may include a roll angle ($\Phi$), a pitch angle ($\theta$), and a yaw angle ($\psi$).

Using the calculated angles of the respective sensors, the control unit 190 may determine whether the flexible transparent display unit 210 is bent, and if bent, whether the flexible transparent display unit 210 is changed from a single layer screen structure to a dual layer screen structure. In some implementations, the flexible transparent display is considered to be changed to a dual layer screen structure when the transparent display is folded (e.g., bent). In one example, the control unit 190 selects, as a representative value, the greatest value from among a roll angle ($\Phi$), a pitch angle ($\theta$) and a yaw angle ($\psi$) of each calculated angle and then calculate an average of representative values. If an average value is within a predetermined range, e.g., from −10 degrees to +10 degrees, the control unit 190 may determine that the flexible transparent display unit 210 is not bent. If an average value is out of a predetermined range, the control unit 190 may determine that the flexible transparent display unit 210 is bent. Further, if an average value is greater than a predetermined value, e.g., 120 degrees, the control unit 190 may determine that the flexible transparent display unit 210 is changed from a single layer screen structure to a dual layer screen structure as shown in FIG. 15B. Also, by using an average value, the control unit 190 may calculate a distance between the screens. For example, the third mapping table may be stored in the memory unit 180, and the control unit 190 may determine a distance between the screens by extracting a value (e.g., 5 centimeters) corresponding to an average value from the third mapping table.

For example, and without limitation, the flexible transparent display unit may be considered changed to a two layer structure (e.g., considered to be folded) if the angle between the points $p_1$ and $p_2$ meets (e.g., exceeds, equals, or falls below.) a predetermined threshold (e.g., see FIG. 15B). The points $p_1$ and $p_2$, in this example, are points on the flexible transparent display where the curvature of the flexible transparent display stops changing. Additionally or alternatively, in some implementations, the flexible transparent display may be considered changed to a two layer structure (e.g., considered to be folded) if the part 1512 of the display is visible through the display part 1511 at a predetermined viewing angle.

Hereinafter, a data display method implemented by the control unit 190 will be described in detail with reference to drawings.

Furthermore, although not shown in the drawings, the electronic device 100 may further include any other suitable components, such as a GPS module, a vibration motor, an accessory, an external device interface (e.g., an ear jack), and the like. An accessory is any item detachable from the electronic device 100 and may be for example a pen used to manipulate a touch screen. As will be understood by those skilled in the art, some of the above-mentioned elements in the electronic device 100 may be omitted or replaced with other elements.

According to various embodiments, an apparatus (e.g., the electronic device 100) includes a first display (e.g., the first display unit 110) and a second display (the second display unit 120) and a control circuit (e.g., the control unit 190) operatively coupled to the first display and the second display. The control unit is configured to perform operations including determining a relative position between the first display and the second display, and displaying information for presenting to a user via at least one of the first display or the second display, based on the relative position.

According to various embodiments, the displaying the information includes displaying a first portion of the information via the first display in a first size and displaying a second portion of the information via the second display in a second size, the first size and the second size being determined based at least in part on the relative position.

According to various embodiments, the displaying the second portion of the information includes determining an offset corresponding to the second portion of the information based at least part on the relative position and displaying, via the second display, the second portion of the information based at least in part on the offset.

According to various embodiments, the displaying the second portion of the information includes acquiring a distance between one of the first display or the second display and the user; and determining at least one of the first size or the second size based at least in part on the relative distance between one of the first display or the second display and the user.

According to various embodiments, the displaying the second portion of the information includes acquiring an angle between the second display and the user and adjusting a location corresponding to the second portion of the information based at least in part on the angle.

According to various embodiments, the displaying the second portion of the information includes acquiring an angle between the second display and the user and determining at least one of the first size or the second size based at least in part on the angle.

According to various embodiments, the first display corresponds to a first portion of a flexible display and the second display corresponds to a second portion of the flexible display.

According to various embodiments, the displaying includes based on the relative position, at least: displaying the information continuously on one side of the flexible display, or dividing the information into at least two portions for display via the first portion and the second portion of the flexible display.

According to various embodiments, the displaying includes determining whether the flexible display is folded based at least in part on an angle between the first display and the second display.

According to various embodiments, the displaying includes acquiring an input to initiate displaying the information via the first display and the second display.

According to various embodiments, the first display and the second display are separate displays, the first display being disposed to be spaced apart from the second display.

According to various embodiments, a non-transitory machine-readable storage device storing instructions that, when executed by one or more processors, cause the one or more processors to perform operations includes determining a relative position between a first display and a second display; displaying a first portion of the information via the first display in a first size; and displaying a second portion of the information via the second display in a second size, the first size and the second size being determined based at least in part on the relative position.

Figure 3:
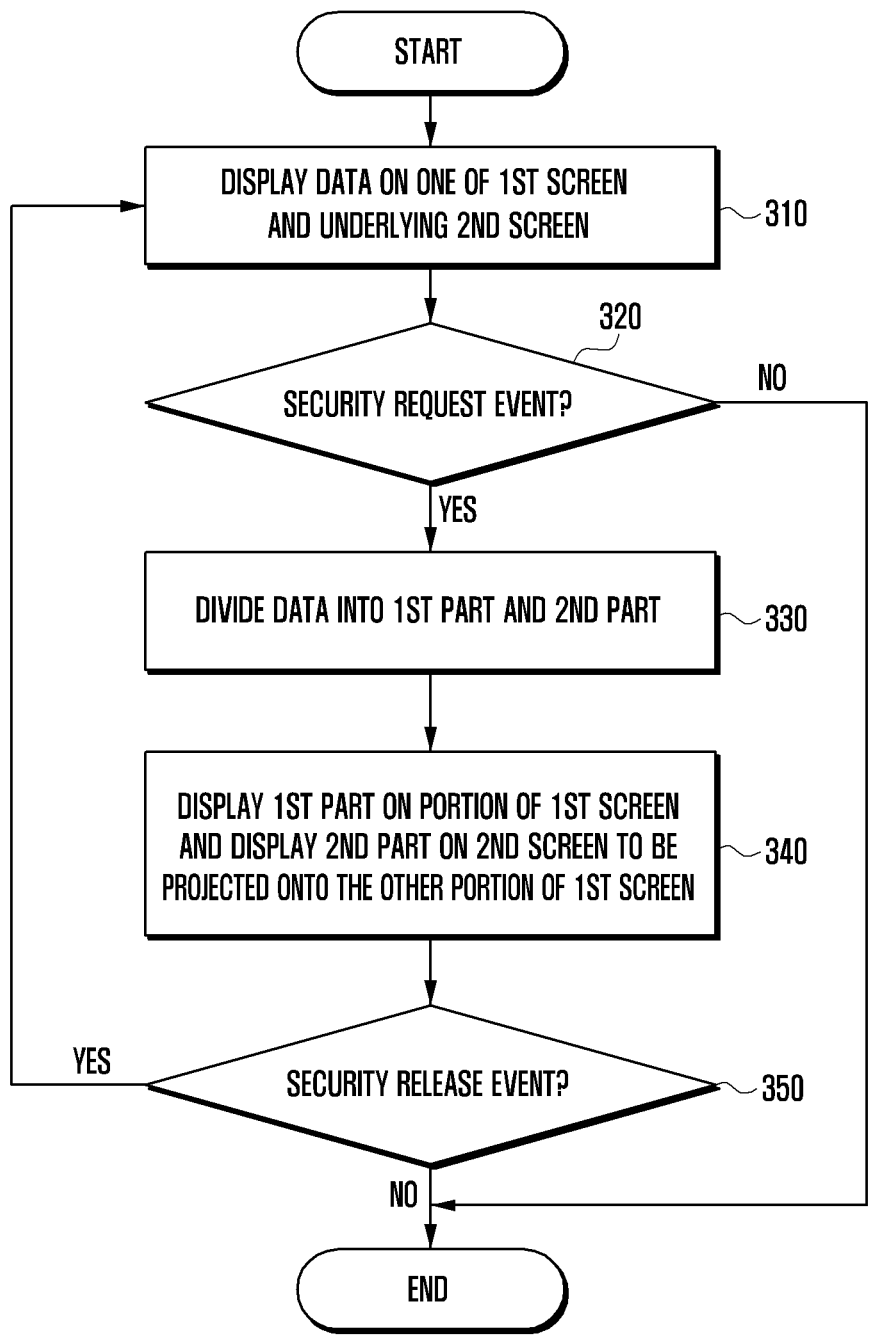
FIG. 3 is a flow diagram illustrating a data display method according to various embodiments of the disclosure.

FIG. 3 is a flow diagram illustrating a data display method in accordance with aspects of the present disclosure, and FIGS. 4 to 7 are diagrams illustrating a division scheme according to various embodiments of the disclosure.

Referring to FIG. 3, at operation 310, the control unit 190 may cause data (e.g., a chatting image 410 as shown in FIG.

4) to be displayed by the electronic device 100. The data may include an image, text, and or any other suitable type of visual content. In one example, as shown in FIG. 1, one of the first display unit 110 and the second display unit 120 may display data on the screen. In another example, as shown in FIG. 2, the flexible transparent display unit 210 may display data on one of the first screen and the underlying second screen.

At operation 320, the control unit 190 determines whether any security request event has occurred. A security request event may be a user gesture on the first display unit 110 (e.g., a tap on a security button displayed on the first display unit 110), or a key event created from the key input unit 130. Additionally or alternatively, a security request event may be voice data. In this case, the microphone MIC may convert a user's voice into audio signals and transfer them to the audio processing unit 150. Then the audio processing unit 150 may convert the received audio signals into digital signals and transfer them to the control unit 190. The control unit 190 receiving audio data from the audio processing unit 150 may convert the received audio data into text and, the text satisfies a predetermined condition, the control unit 190 may determine that a security request event occurs. In some instances, the predetermined condition may be satisfied if a particular keyword, such as "security" is found in the text.

Additionally or alternatively, the occurrence of a security event may be determined based on a change in the shape of the flexible transparent display. For example, in case the flexible transparent display unit 210 is changed from a single layer screen structure to a dual layer screen structure, the control unit 190 may determine that this change of structure corresponds to 'a security request event. As another example, if the flexible transparent display unit 210 is deformed, and a characteristic of the deformation satisfies a predetermined condition, the control unit 190 may determine that this change of structure corresponds to 'a security request event. As noted above, in some instances, the predetermined condition may be satisfied if a degree of an arch formed by the flexible transparent display unit 210 exceeds a threshold.

If a security event request is detected, the process proceeds to operation 330. Otherwise, when a security event request is not detected, the process ends.

Figure 4:
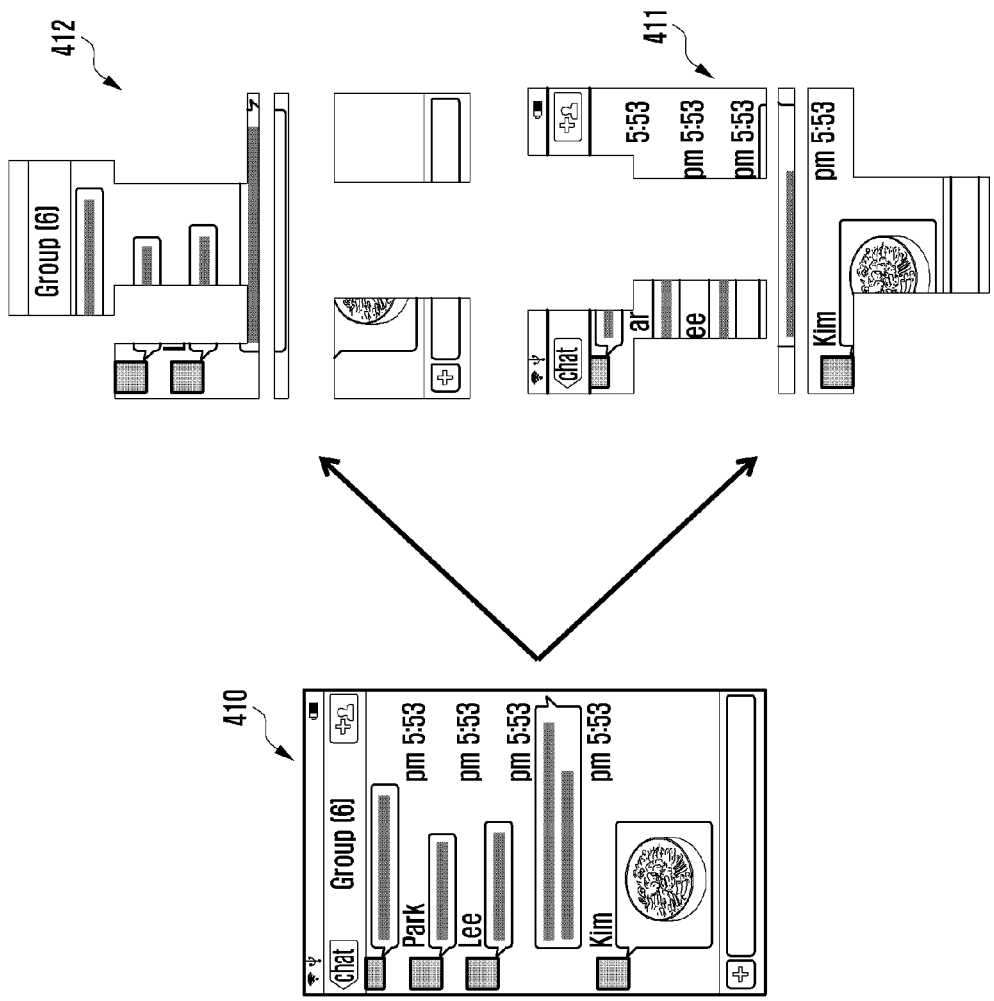
Figure 5:
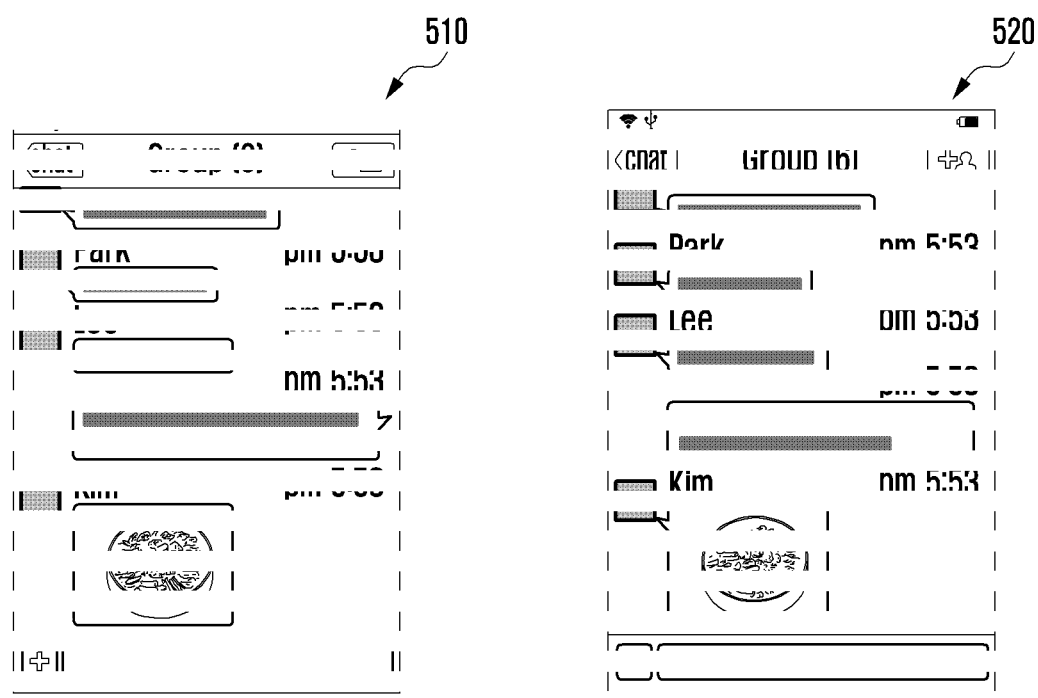
Figure 6:
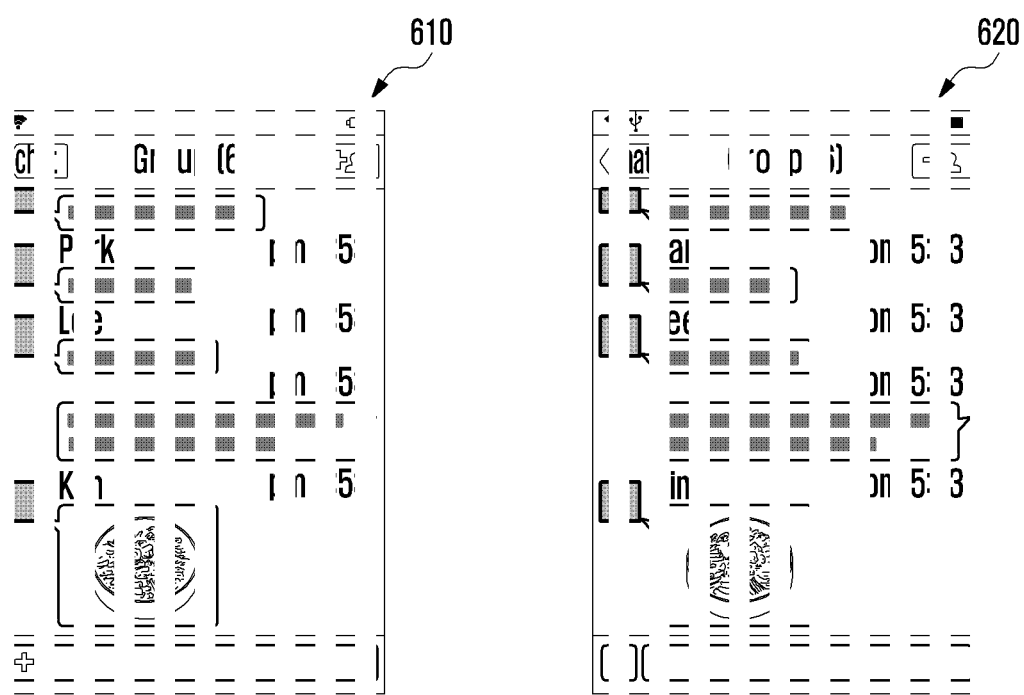

At operation 330, the control unit 190 may divide the data 410 into the first part 411 and the second part 412 as shown in FIG. 4. The first and second parts 411 and 412 may have various shapes. Specifically, the control unit 190 may divide the data 410 at random and separate cut parts, such as the first part 411 and the second part 412. Additionally or alternatively, in some implementations, the control unit 190 may cut the data according to a predetermined pattern. For example, as shown in FIG. 5, the control unit 190 may cut data horizontally and separate cut parts into the first part 510 and the second part 520. Alternatively, as shown in FIG. 6, the control unit 190 may cut data vertically and separate cut parts into the first part 610 and the second part 620.

At operation 340, the control unit 190 may cause the first part of data to be displayed by the first screen at a first location of the first screen. In addition, the control unit 190 may cause the second part of the data to be displayed by the second screen at a second location of the second screen. For example, under the control of the control unit 190, the first display unit 110 may display the first part of data on the screen thereof, and the second display unit 120 may display the second part of data on the screen thereof. Alternatively, under the control of the control unit 190, the flexible transparent display unit 210 may display the first part of data on the first screen and also display the second part of data on the second screen. Therefore, data may be seen fully when viewed from the front of the electronic device 100 as shown in FIG. 7 (a) while the same data may appear obscured when viewed from the sides of the electronic device 100 as shown in FIG. 7 (b).

At operation 350, the control unit 190 may determine whether a security release event occurs. A security release event may be a user gesture on the first display unit 110 (e.g., to tap a cancel button displayed on the first display unit 110), or a key event created from the key input unit 130. Additionally or alternatively, a security release event may be voice data (e.g., cancel, end, over, etc.). In case the flexible transparent display unit 210 is changed from a dual layer screen structure to a single layer screen structure, the control unit 190 may determine that this change of structure corresponds to 'a security release event'.

When any security release event occurs, the control unit 190 may execute operation 310 again and cause the entire data to be displayed on one of the first and second screens.

Figure 8:
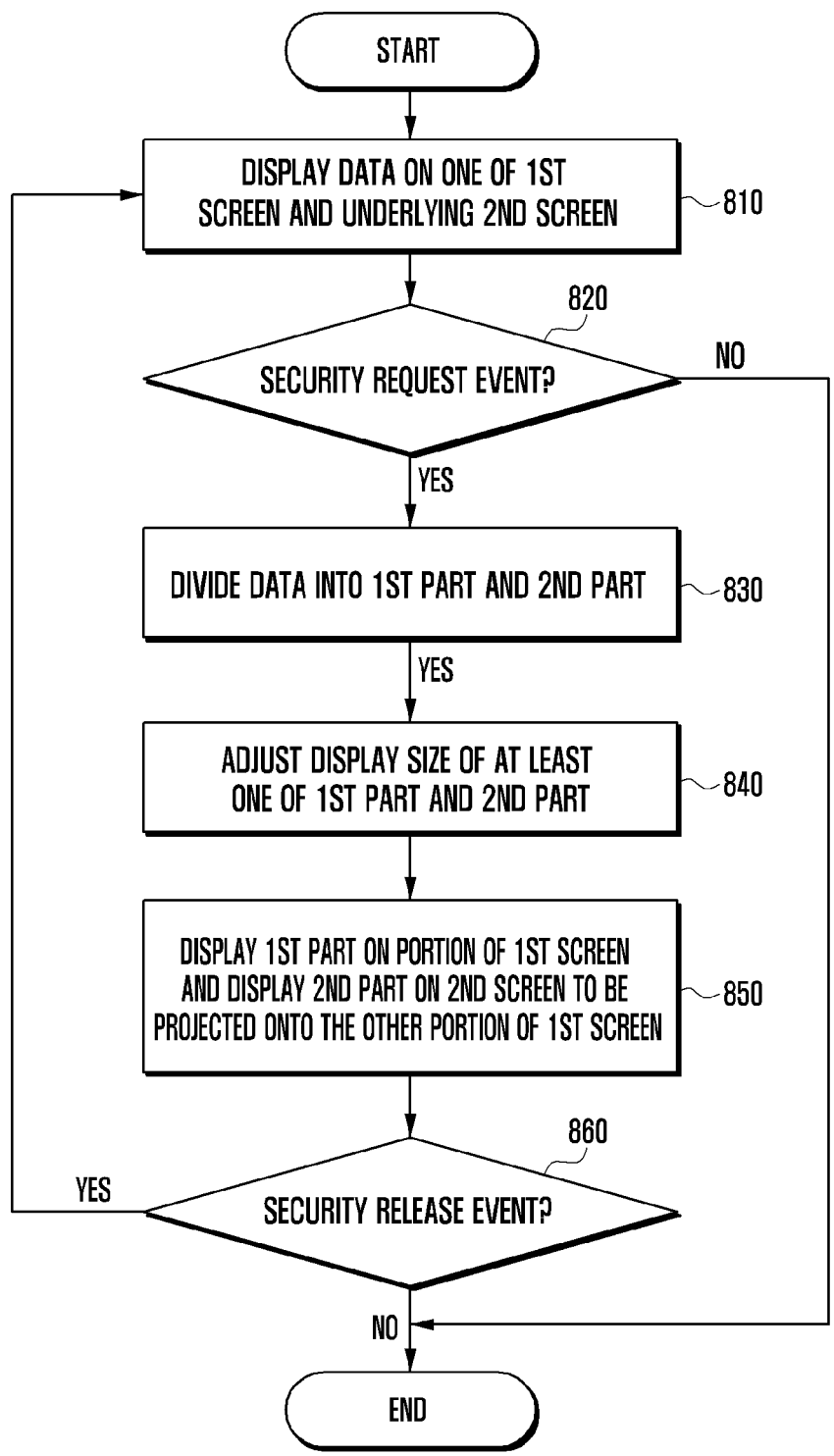
FIG. 8 is a flow diagram illustrating a data display method according to various embodiments of the disclosure.

FIG. 8 is a flow diagram illustrating a data display method according to various embodiments of the disclosure. At operation 810, the control unit 190 may control data to be displayed on one of the first screen and the underlying second screen. At operation 820, the control unit 190 may determine whether any security request event occurs. In case any security request event occurs, the control unit 190 may divide data into the first part and the second part at operation 830. Otherwise, in case that the security event does not occur, the execution of the process ends.

At operation 840, the control unit 190 may adjust the size of at least one of the first and second parts of data. For example, if the ratio of the first part to the second part is 1:1, the first part may look smaller in comparison with the second part when viewed in perspective. Therefore, in this case, the control unit 190 may reduce the size of the first part at a given reduction rate (e.g., 0.9). In instances where the flexible transparent display unit 210 is deformed, the control unit 190 may determine a distance between the first and second screens as mentioned above and then determine a reduction rate based on the distance. For example, a reduction rate may be determined to be 0.8 when a distance is 10 centimeters. Similarly, a reduction rate may be determined to be 0.9 when a distance is 5 centimeters. Additionally or alternatively, the reduction rate may be determined based on a distance between the electronic device 100 and a user's eye may be used. Related examples will be described below. Although in this example, the first part is reduced relative to the second part, in other examples the second part may be enlarged relative to the first part. For example, the second part may be enlarged by an enlargement ratio that is determined based on at least one of a distance from the user's eye(s), a distance between screens, and/or any other suitable parameter.

At operation 850, the control unit 190 may cause the first part of the data to be displayed by the first screen at a first location in the first screen. In addition, the control unit 190 may cause the second part of the data to be displayed by the second screen at a second location of the second screen. At operation 860, the control unit 190 may determine whether a security release event occurs. When any security release event occurs, the control unit 190 may execute operation 810 and cause the entire data to be displayed on one of the first and second screens.

Figure 9:
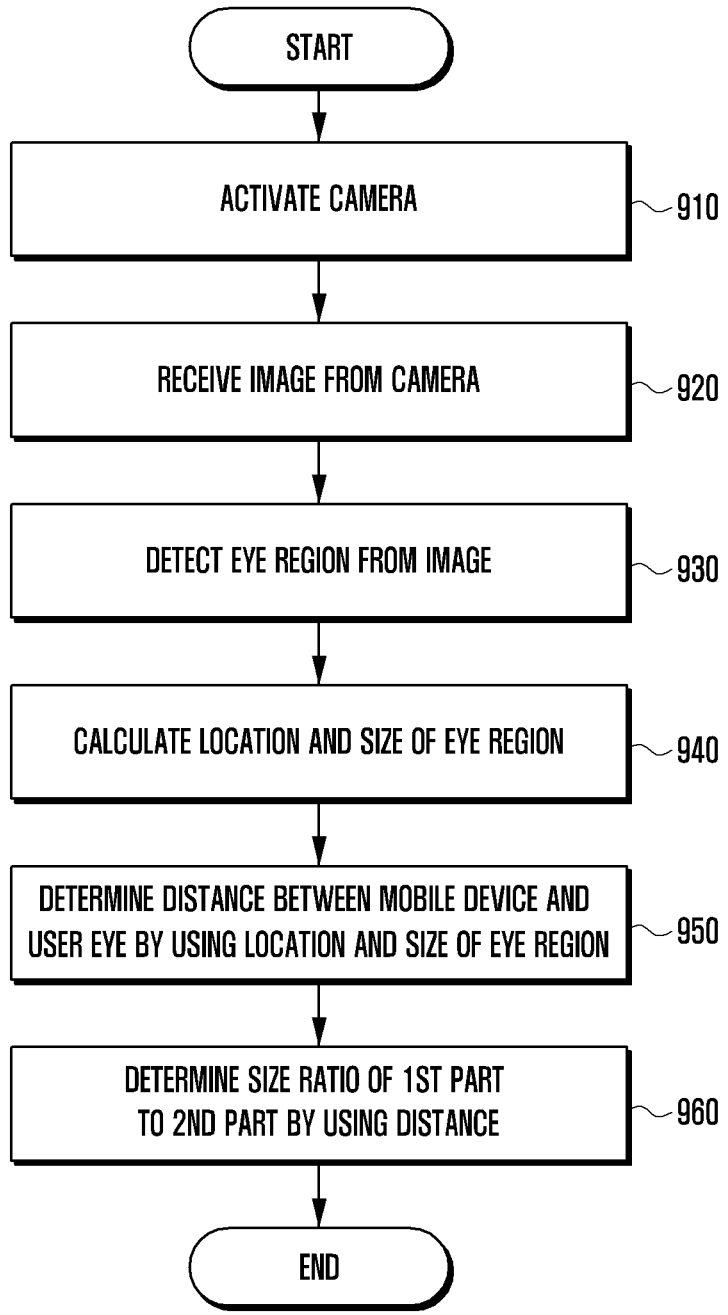
FIG. 9 is a flow diagram illustrating a method for adjusting a data size according to various embodiments of the disclosure.
Figure 10A:
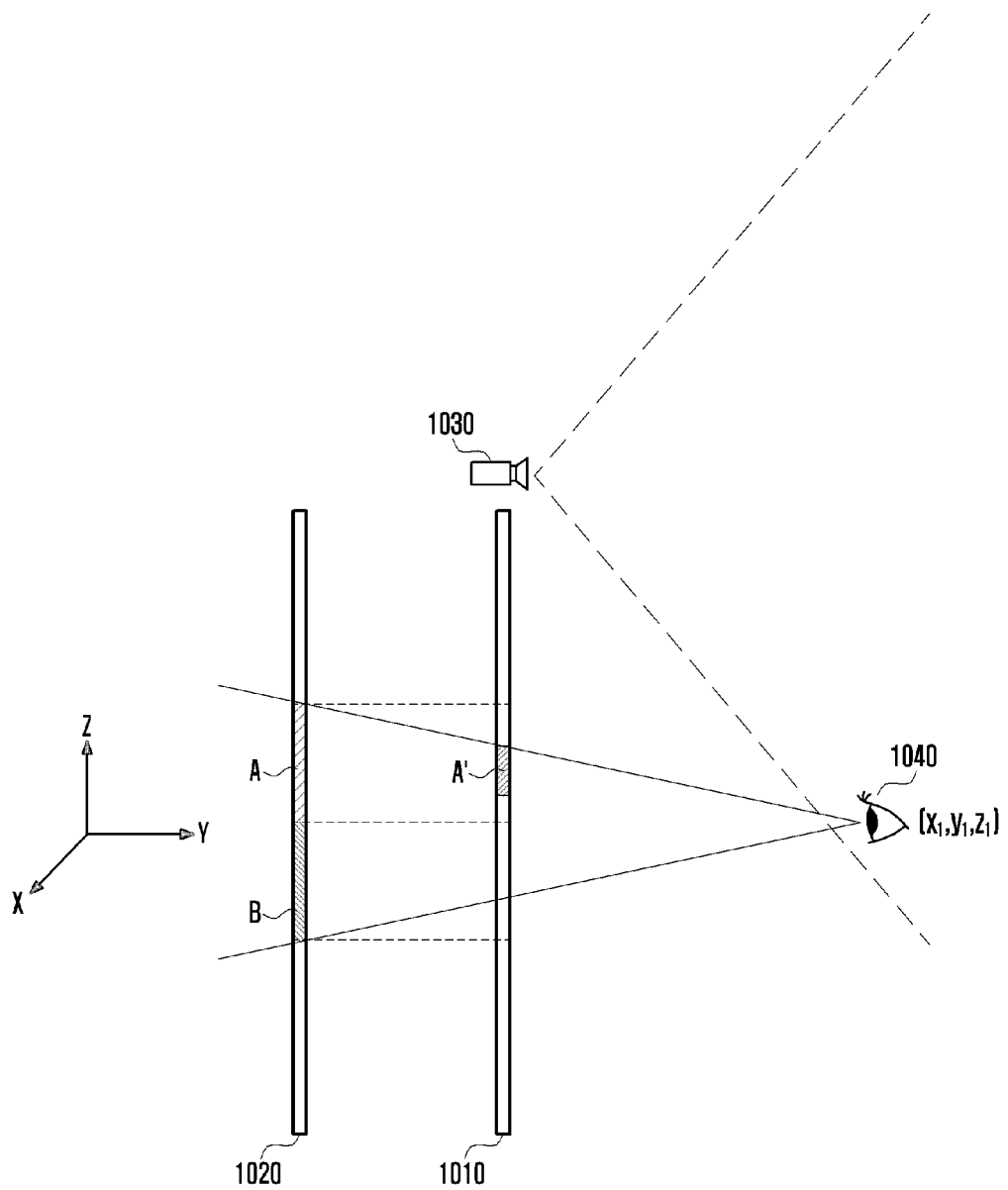

FIG. 9 is a flow diagram illustrating a method for adjusting a data size in accordance with aspects of the present disclosure, and FIGS. 10A and 10B are diagrams illustrating a method for adjusting a data size in accordance with embodiments of the present disclosure. Referring to FIG. 9, at operation 910, the control unit 190 may activate the camera 160. This operation 910 may be performed in response to any security request event. In some instances, the camera 160 may be activated in advance before a security request event occurs. Additionally or alternatively, the activated camera may be one that is facing in the same direction as the screens of the electronic device 100. Additionally or alternatively, in some instances, activating the camera may include causing the camera to capture an image of the user of the electronic device 100.

At operation 920, the control unit 190 may receive an image from the camera 160. At operation 930, the control unit 190 may detect an eye region from the received image. At 940, the control unit 190 may calculate the location and size of the eye region. At operation 950, the control unit 190 may determine a distance between the electronic device 100 and a user's eye by using the calculated location and size of the eye region at operation 950. For example, the control unit 190 may search the first mapping table 181 based on the location and size of the eye region in the first mapping table 181. At operation 960, the control unit 190 may determine a size ratio (e.g., a reduction rate or an enlargement rate) of the first part based on the determined distance. As discussed above, the control unit 190 may determine the retrieve the ratio from the second mapping table 182 based on the determined distance.

Referring FIG. 10A, the control unit 190 may cause data comprising parts A and B to be displayed on the second screen 1020. If any security request event occurs, the control unit 190 may divide the data into the first part A and the second part B. Then the control unit 190 may determine a distance "$z_1$" between the electronic device 100 and user's eye 1040 by using the first image received from a camera 1030 installed in the electronic device 100. Additionally, the control unit 190 may determine a reduction rate of the first part A based on the distance "$z_1$", reduce the first part A to A' on the basis of the determined reduction rate, and cause the reduced first part A' to be displayed on the first screen 1010. Referring FIG. 10B, the control unit 190 may determine a distance "$z_2$" between the electronic device 100 and user's eye 1040 based on the second image received from the camera 1030. Additionally, the control unit 190 may determine a reduction rate of the first part A by using the distance "$z_2$", reduce the first part A to A" on the basis of the determined reduction rate, and cause the reduced first part A" to be displayed on the first screen 1010. Here the distance "$z_2$" is greater than the distance "$z_1$", so the part A" is made smaller than the part A'. For example, as the distance between the user's eye 440 and the electronic device 100 changes, the size of the first part A may be dynamically adjusted (e.g., increased or decreased) to accommodate the changes in the distance.

Figure 11:
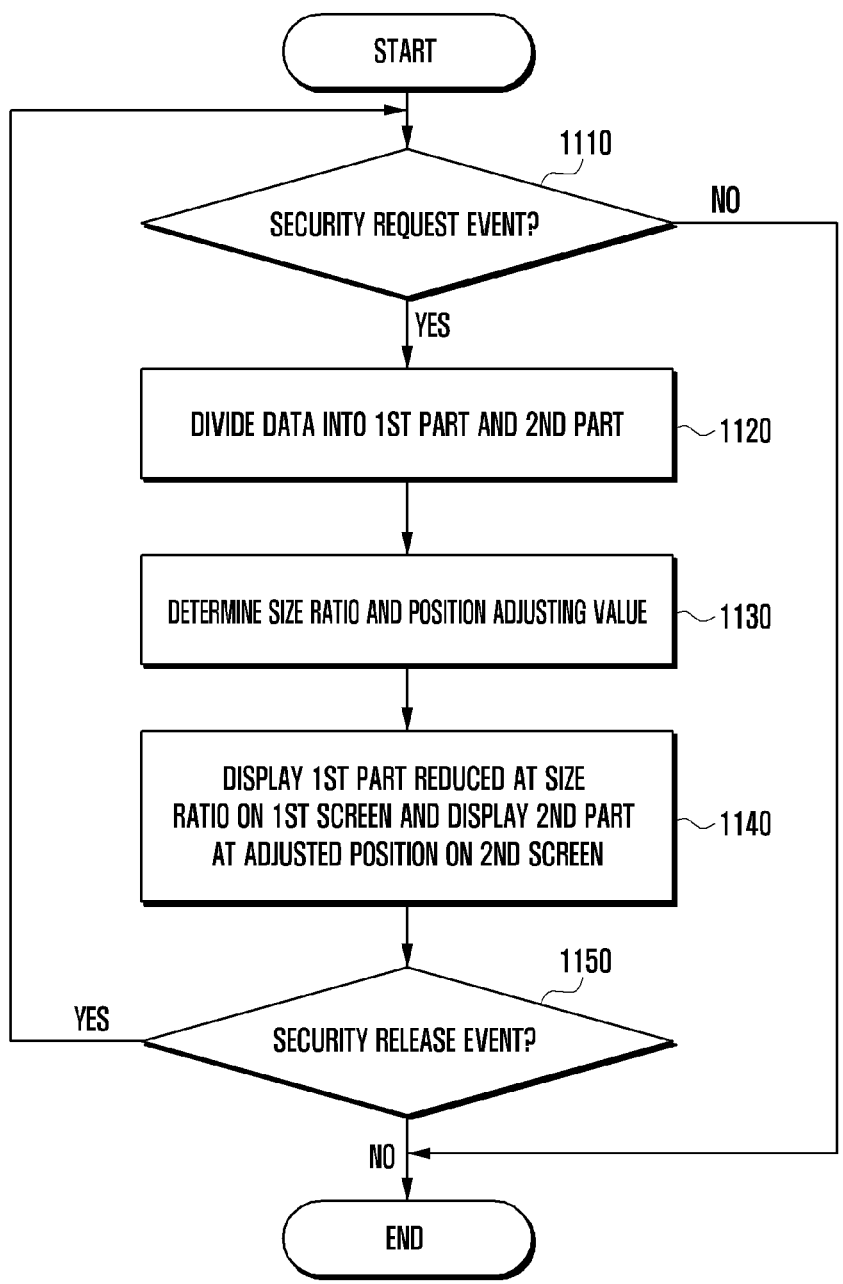
FIG. 11 is a flow diagram illustrating a data display method according to various embodiments of the disclosure.

FIG. 11 is a flow diagram illustrating a data display method according to various embodiments of the disclosure. Referring to FIG. 11, at operation 1110, the control unit 190 may determine whether a security request event occurs. If a security request event is detected, the process proceeds to operation 1120. Otherwise, the execution of the process ends.

At operation 1120, the control unit 190 may divide data that is being displayed on only one of the screens of the electronic device 100 into first and second parts. Then, at operation 1130, the control unit 190 may determine a scale ratio of the first part (e.g., determine how much the size of the first part should be reduced or increased) and also determine a position adjusting value for adjusting a display position of the second part. A detailed example of operation 1130 will be described later with reference to FIG. 12. At operation 1140, the control unit 190 may reduce the first part based on the determined scale ratio, control the reduced first part to be displayed on the first screen, determine a display position of the second part by using the determined position adjusting value, and control the second part to be displayed at the determined display position of the second screen. At operation 1150, the control unit 190 may determine whether a security release event occurs. When any security release event occurs, the electronic device 100 may return to a state at which it was prior to the execution of operation 1150.

Figure 12:
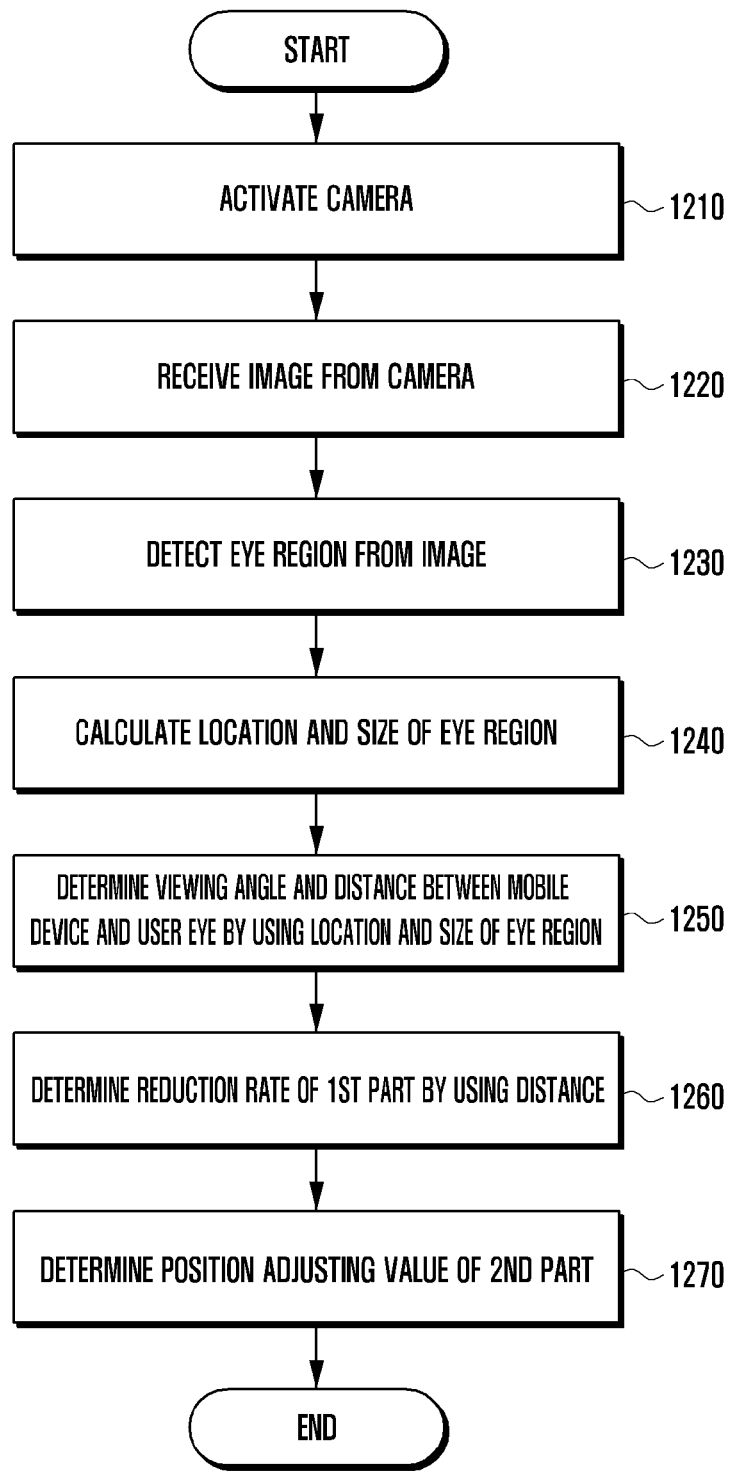
FIG. 12 is a flow diagram illustrating a method for adjusting a data display position according to various embodiments of the disclosure.
Figure 13:
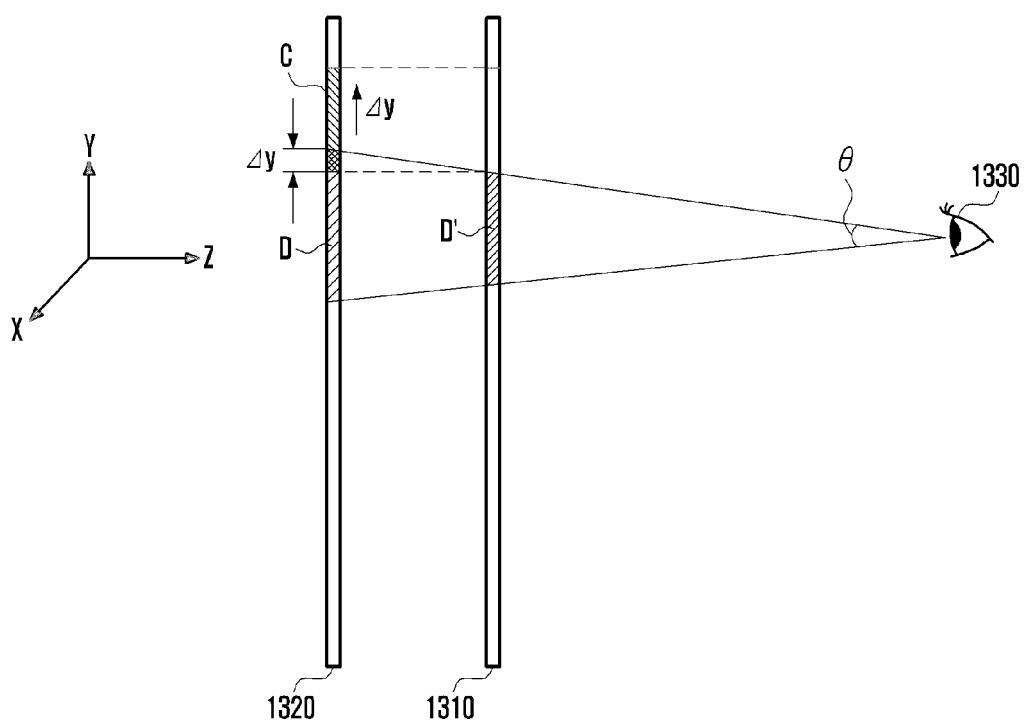
FIG. 13 is a diagram illustrating a method for adjusting a data display position according to various embodiments of the disclosure.

FIG. 12 is a flow diagram illustrating a method for adjusting a data display position in accordance with aspects of the present disclosure, and FIG. 13 is a diagram illustrating a method for adjusting a data display position according to various embodiments of the disclosure.

Referring to FIG. 12, at operation 1210, the control unit 190 may activate the camera 160. Then the control unit 190 may receive an image from the camera 160 at operation 1220, detect an eye region from the received image at operation 1230, calculate the location and size of the eye region at operation 1240, and determine a viewing angle as well as a distance between the electronic device 100 and a user's eye by using the calculated location and size of the eye region at operation 1250. For example, at operation 1250, the control unit 190 may search the mapping table 181 to identify at least one of a distance and a viewing angle each of which corresponds to the location and size of the eye region. At operation 1260, the control unit 190 may determine a reduction rate of the first part, by using the determined distance. For example, at operation 1260, the control unit 190 may determine the reduction rate by searching the second mapping table 182 based on the determined distance. At operation 1270, the control unit 190 may determine a position adjusting value of the second part by using the determined viewing angle. For example, the control unit 190 may determine the position adjusting value by searching the second mapping table 182 based on the determined viewing angle.

Referring FIG. 13, the control unit 190 may cause data to be displayed on the second screen 1320. If any security request event occurs, the control unit 190 may divide the data into a first part D and a second part C. Then, by using the image received from the camera, the control unit 190 may determine a viewing angle (θ) of a user's eye 1330 as well as a distance between the electronic device 100 and the user's eye 1330. Additionally, by using the determined distance, the control unit 190 may reduce the first part D to D' and cause the reduced first part D' to be displayed on the first screen 1310. Further, by using the determined viewing angle (θ), the control unit 190 may determine a position adjusting value Δy (e.g., an offset) and control the second part C to be displayed on the second screen 1320 at a position adjusted according to the position adjusting value. Although in this example, the determined offset is one with respect to the position at which the second part C is initially displayed on the screen 1320, in other examples offset may be determined for the first part D/D'. In such examples, the offset may be relative to the position in the screen 1320 where the part D is initially displayed. Furthermore, in such examples, the location in the screen 1310, where the part D' is displayed may be determined based on the offset.

Furthermore although in this example the viewing angle is one that is formed by the lines extending from the edges of the first portion D to the user's eye 1330, in other examples the viewing angle may include any suitable indicium of the position of the user's eye (or the user) relative to the electronic device 100. For example the viewing angle may indicate how far to the left (or right) of the electronic device 100 is the user's eye located, or how far above the top edge of the electronic device 100 (or below the bottom edge) is the user's eye located. Thus, by way of example, the viewing angle may be any suitable indication of an angle from which the user is viewing the electronic device.

Figure 14:
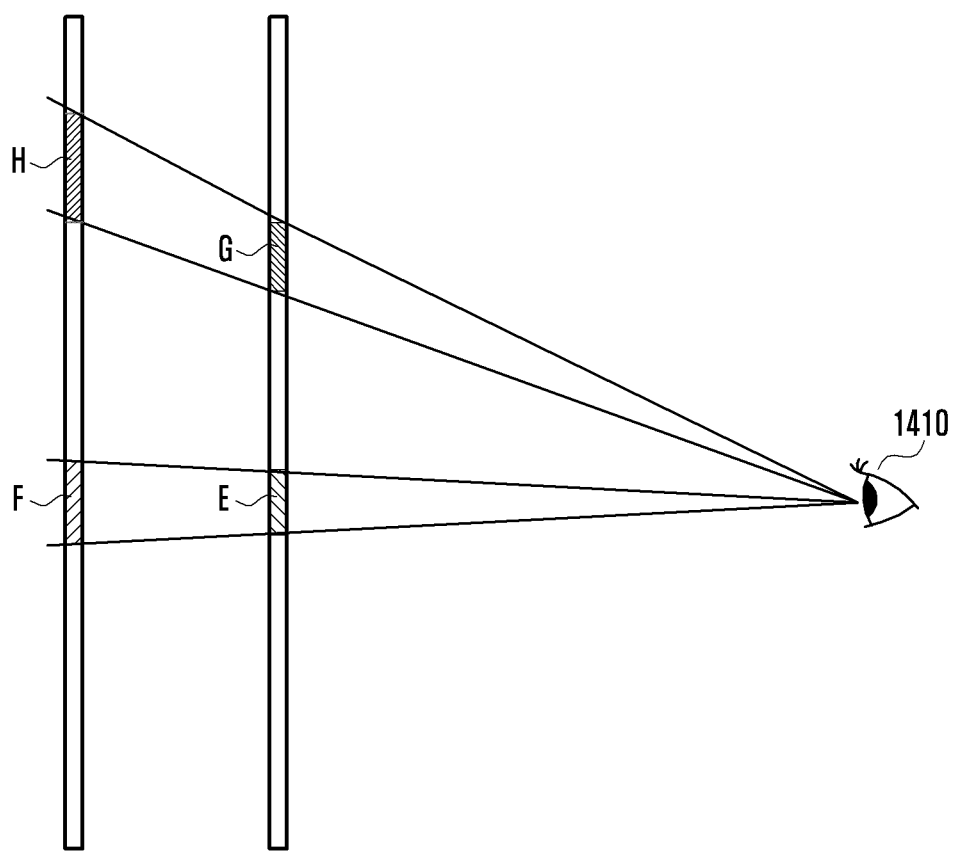
FIG. 14 is a flow diagram illustrating a method for adjusting a data size according to various embodiments of the disclosure.

FIG. 14 is a flow diagram illustrating a method for adjusting a data size in accordance with another embodiment of the present disclosure.

Referring to FIG. 14, data portions E and F are located straight in front of a user's eye 1410, and data portions G and H are located above and further from the user's eye 1410 than data portions E and F. Due to its increased distance from the user's eye, data G appears smaller than data portion E, and data H appears smaller than data portion F. To account for this effect, the control unit 190 may enlarge data located at a peripheral region by a greater amount than data located at a central region is enlarged.

Figure 15A:
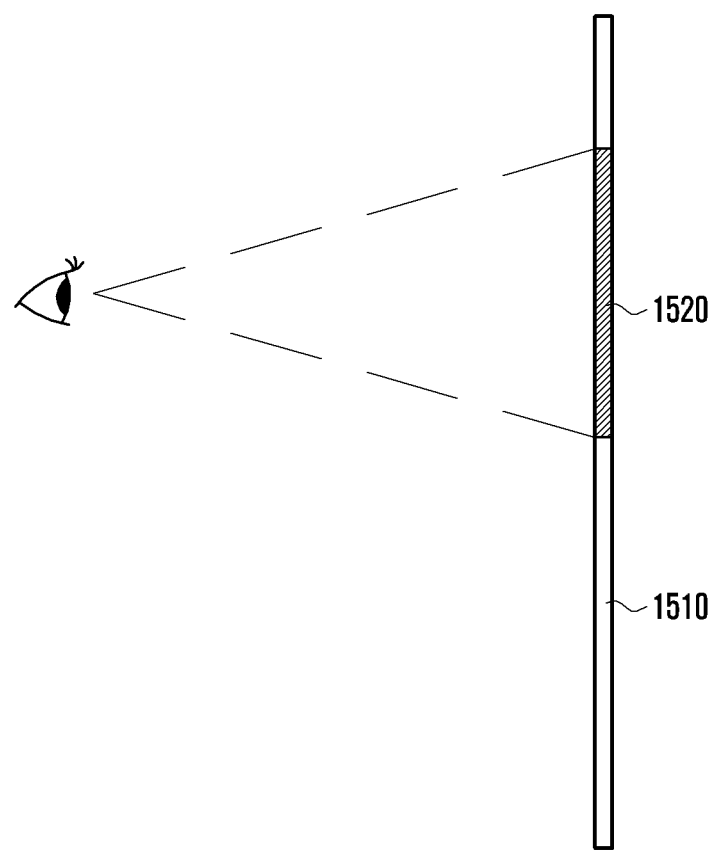
FIGS. 15A and 15B are diagrams illustrating a data display method according to various embodiments of the disclosure.
Figure 15B:
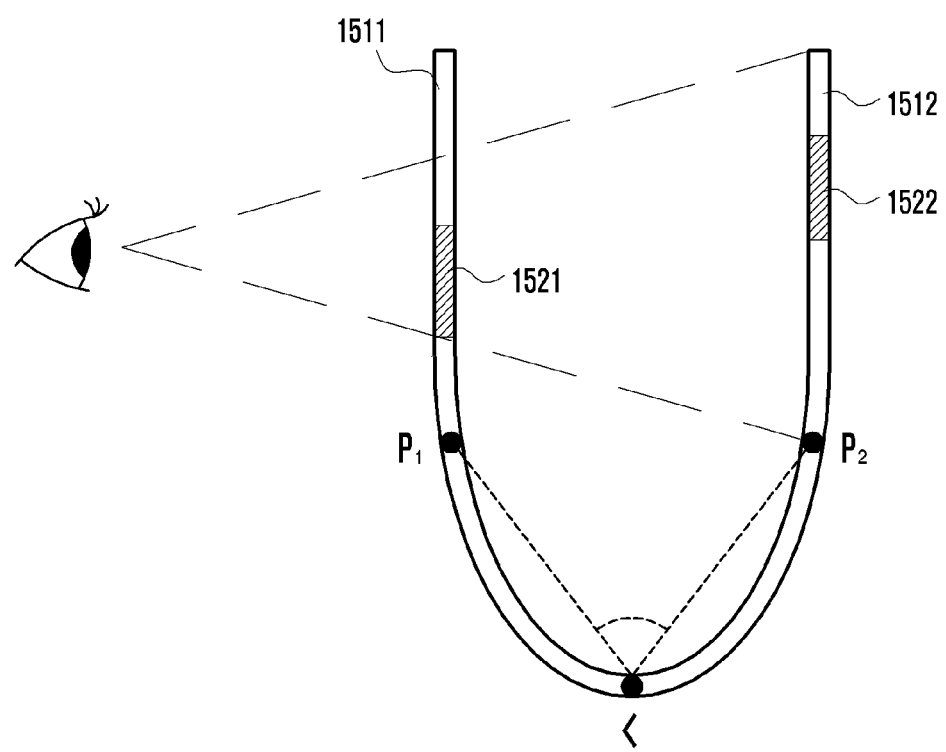

FIGS. 15A and 15B are diagrams illustrating a data display method according to various embodiments of the disclosure.

Referring to FIG. 15A, the flexible transparent display unit 210 may display data 1520 on a screen 1510 under the control of the control unit 190. The control unit 190 may receive transform information from the flexible transparent display unit 210 and calculate a characteristic of a bend of the flexible transparent display unit 210 (e.g., an angle of bend) by using the received transform information. In case the calculated angle is greater than a predetermined value (e.g., 120 degrees), the control unit 190 may determine that the flexible transparent display unit 210 is changed from a single layer screen structure to a dual layer screen structure as shown in FIG. 15B. In a dual layer screen structure, the control unit 190 may define the first screen 1511 and the second screen 1512. The first screen 1511 and the second screen 1512 are disposed on different sides of a line L along which the flexible transparent display unit 210 is folded. Furthermore, the control unit 190 may divide the data 1520 into the first part 1521 and the second part 1522. Then the control unit 190 may control the flexible transparent display unit 210 to display the first part 1521 on the first screen 1511 and also to display the second part 1522 on the second screen 1512. Thus, in some implementations, instead of using multiple screens, a single flexible screen can be used to implement at least some of the techniques discussed throughout the present disclosure.

According to various embodiments, a method includes determining a relative position between a first display and a second display, the first display and the second display being operatively coupled to an electronic device. The method also includes displaying information for presenting to a user via at least one of the first display or the second display, based on the relative position.

According to various embodiments, the determining includes acquiring an input to initiate displaying the information via the first display and the second display.

According to various embodiments, the displaying includes displaying a first portion of the information via the first display in a first size and displaying a second portion of the information via the second display in a second size, the first size and the second size being determined based at least in part on the relative position.

According to various embodiments, the displaying the first portion and the second portion of the information includes intersecting the first portion of the information by the second portion of the information.

According to various embodiments, the displaying the second portion of the information includes acquiring a relative position between the electronic device and the user; and determining at least one of the first size or the second size based at least in part in on the relative position between the electronic device and a user.

According to various embodiments, the determining includes identifying a first portion of a flexible display as the first display and identifying a second portion of the flexible display as the second display.

According to various embodiments, the method also includes identifying that the first portion of the flexible display is disposed spaced apart from the second portion of the flexible display.

According to various embodiments, the displaying includes determining whether the flexible display is folded; and displaying a first portion of the information via the first display and a second partition of the information via the second display based on a determination that the flexible display is folded.

It should be provided that the flowcharts of the present disclosure are provided as examples only. Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved. Furthermore, in some implementations, one or more of the functions denoted by the blocks may be omitted. And still furthermore, in some implementations, one or more of the functions may be performed by different electronic circuitry modules that are part of the control unit 190.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While this disclosure has been particularly shown and described with reference to an exemplary embodiment thereof, it will be understood by those skilled in the art that various changes in form and details may be made therein without departing from the spirit and scope of this disclosure as defined by the appended claims.

The invention claimed is:

1. An apparatus comprising:
   a first display and a second display; and
   at least one processor operatively coupled to the first display and the second display, configured to perform operations comprising:
      while an image is displayed by one of the first display and the second display, dividing the image into a first portion and a second portion in response to a request,
      determining a relative position between the first display and the second display, and
      control the first display and the second display to display the first portion and the second portion of the divided image respectively, based on the relative position.

2. The apparatus of claim 1, wherein the displaying the image comprises:
   displaying the first portion of the image via the first display in a first size; and
   displaying the second portion of the image via the second display in a second size, the first size and the second size being determined based at least in part on the relative position.

3. The apparatus of claim 2, wherein the displaying the second portion of the image comprises:
   determining an offset corresponding to the second portion of the image based at least part on the relative position; and
   displaying, via the second display, the second portion of the image based at least in part on the offset.

4. The apparatus of claim 2, wherein the displaying the second portion of the image comprises:
   acquiring a distance between one of the first display or the second display and a user; and
   determining at least one of the first size or the second size based at least in part on the distance between one of the first display or the second display and a user.

5. The apparatus of claim 2, wherein the displaying the second portion of the image comprises:
   acquiring an angle between the second display and a user; and
   adjusting a location corresponding to the second portion of the image based at least in part on the angle.

6. The apparatus of claim 2, wherein the displaying the second portion of the image comprises:
   acquiring an angle between the second display and a user; and
   determining at least one of the first size or the second size based at least in part on the angle.

7. The apparatus of claim 1, wherein the first display corresponds to a first portion of a flexible display and the second display corresponds to a second portion of the flexible display.

8. The apparatus of claim 7, wherein the displaying comprises, based on the relative position, executing at least one of:
   displaying the image continuously on one side of the flexible display, and
   dividing the image into at least two portions for display via the first portion and the second portion of the flexible display.

9. The apparatus of claim 7, wherein the displaying comprises:
   determining whether the flexible display is folded based at least in part on an angle between the first display and the second display.

10. The apparatus of claim 1, wherein the displaying comprises:
    acquiring an input to initiate displaying the image via the first display and the second display.

11. The apparatus of claim 1, wherein the first display and the second display are separate displays, the first display being disposed to be spaced apart from the second display.

12. A method comprising:
    while an image is displayed by one of a first display and a second display, dividing by a processor the image into a first portion and a second portion in response to a request:
    determining a relative position between the first display and the second display, the first display and the second display being operatively coupled to an electronic device; and
    displaying the first portion and the second portion of the divided image via the first display and the second display respectively, based on the determined relative position.

13. The method of claim 12, wherein the determining comprises:
    acquiring an input to initiate displaying the image via the first display and the second display.

14. The method of claim 12, wherein the displaying comprises:
    displaying a first portion of the image via the first display in a first size; and
    displaying a second portion of the image via the second display in a second size, the first size and the second size being determined based at least in part on the relative position.

15. The method of claim 14, wherein the displaying the first portion and the second portion of the image comprises:
    intersecting the first portion of the image by the second portion of the image.

16. The method of claim 14, wherein the displaying the second portion of the image comprises:
    acquiring a relative position between the electronic device and a user; and
    determining at least one of the first size or the second size based at least part in on the relative position between the electronic device and a user.

17. The method of claim 12, wherein the first display and the second display are a first portion of a flexible display and a second portion of the flexible display, respectively, the method further comprising:
    identifying that the first portion of the flexible display is disposed spaced apart from the second portion of the flexible display.

18. The method of claim 17, wherein the displaying comprises:
    determining whether the flexible display is folded; and
    displaying a first portion of the image via the first display and a second partition of the image via the second display based on a determination that the flexible display is folded.

19. A non-transitory machine-readable storage device storing instructions that, when executed by one or more processors, cause the one or more processors to perform operations comprising:
    while an image is displayed on one of a first display and a second display, dividing the image into a first portion and second portion in response to a security request;
    determining a relative position between the first display and the second display;
    controlling the first display to display the first portion of the divided image in a first size; and controlling the second display to display the second portion of the image in a second size, the first size and the second size being determined based at least in part on the relative position.

\* \* \* \* \*